United States Patent [19]

van der Lely

[11] 4,042,040
[45] Aug. 16, 1977

[54] CULTIVATORS

[76] Inventor: Cornelis van der Lely, 7, Bruschenrain, Zug, Switzerland

[21] Appl. No.: 685,361

[22] Filed: May 11, 1976

Related U.S. Application Data

[60] Division of Ser. No. 450,738, March 13, 1974, Pat. No. 3,971,445, which is a continuation of Ser. No. 233,113, March 9, 1972, abandoned.

[51] Int. Cl.² .................. A01B 33/06; A01B 33/08
[52] U.S. Cl. .................................. 172/59; 172/125; 74/15.4
[58] Field of Search ............... 172/59, 49, 125, 111; 74/15.4

[56] References Cited

U.S. PATENT DOCUMENTS

| 1,697,677 | 1/1929 | Davidson | 172/59 |
| 3,616,862 | 11/1972 | Lely | 172/59 |
| 3,667,551 | 6/1972 | Lely | 172/59 |
| 3,774,688 | 11/1973 | Lely | 172/59 |

Primary Examiner—Richard J. Johnson
Attorney, Agent, or Firm—Mason, Mason & Albright

[57] ABSTRACT

A cultivator has soil working members on upwardly extending shafts that are driven by a transmission from the p.t.o. of a prime mover. The transmission includes a transmission shaft that drives an extension of one of the upwardly extending shafts via a speed change gear mechanism of exchangeable pinions. The pinions are located at the top of the mechanism for easy and quick access and the shaft extension is positioned in front of the transmisson shaft. The soil working members are driven through spur toothed pinions in mesh with one another and housed in a hollow frame portion of the cultivator.

4 Claims, 2 Drawing Figures

CULTIVATORS

This invention relates to cultivators comprising a row of soil working members, each soil working member comprising a corresponding upwardly extending shaft which can be driven from the power take-off shaft of an operating tractor or other vehicle by way of a transmission mechanism that includes a shaft arranged to be placed in connection with said power-take off shaft.

Figure 1:
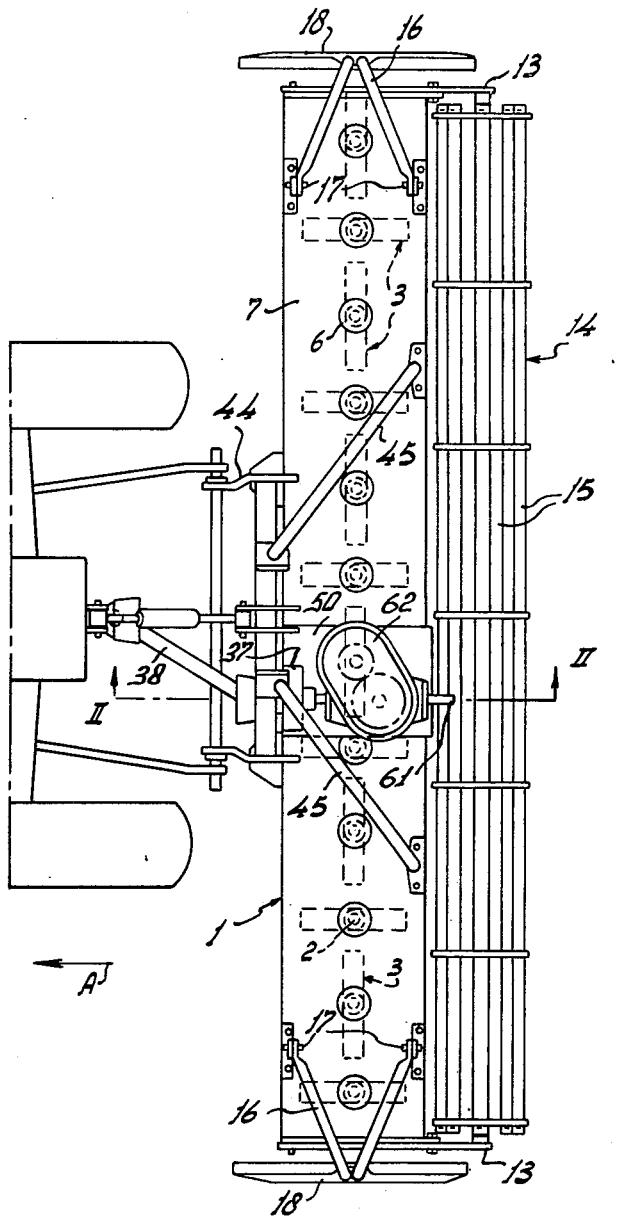
Figure 2:
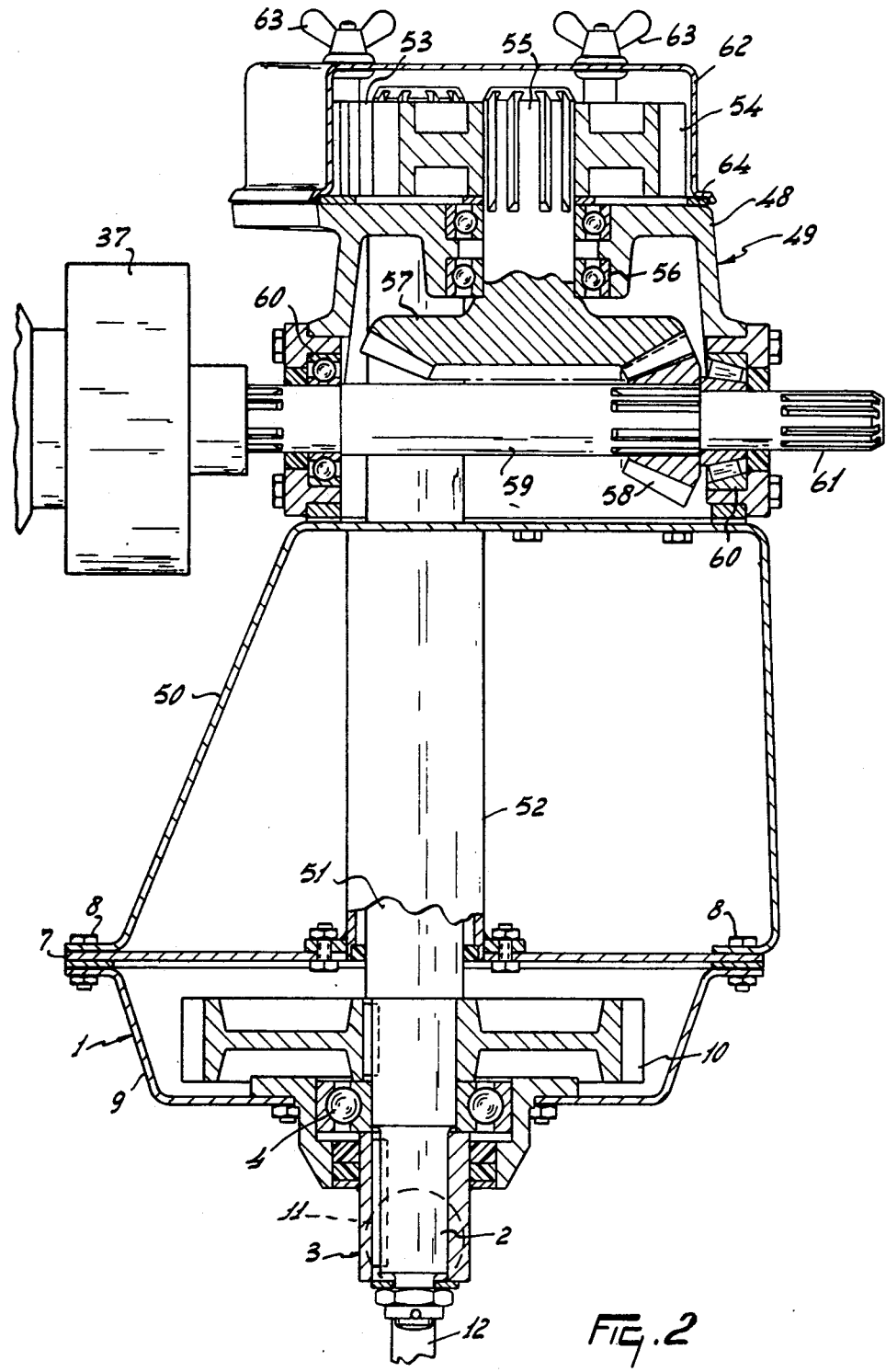

According to the invention, said shaft is arranged to operate a driving shaft of said transmission mechanism, that is afforded by an extension of the upwardly extending shaft of one of the soil working members, through the intermediary of exchangeable pinions which are located at the top of said transmission mechanism during the use of the cultivator. For a better understanding of the invention, and to show how the same may be carried into effect, reference will now be made, by way of example, to the accompanying drawings; in which:

FIG. 1 is a plan view of a soil cultivating implement or cultivator in accordance with the invention, and FIG. 2 is a section, to an enlarged scale, taken on the line II—II of FIG. 1 showing transmission mechanism of the cultivator in greater detail. Referring to the drawings, the soil cultivating implement or cultivator that is illustrated has a hollow main frame beam 1 that extends substantially horizontally and substantially perpendicularly transverse to the intended direction of operative travel of the cultivator which is indicated by an arrow A in FIG. 1 of the drawings. The beam 1 is preferably formed from sheet iron but could also be formed from other sheet metals. The hollow beam 1 carries a single row of soil working members 3 of which there are twelve in the embodiment that is being described. Each soil working member 3 is mounted at the lower end of a corresponding vertical or substantially vertical upright rotary shaft 2, the shafts 2 lying in side-by-side relationship in a single row that extends parallel to the longitudinal axis of the beam 1. Each shaft 2 is journalled in a corresponding substantially vertical bearing 4 that is mounted in a recess in the bottom of the main frame beam 1. The upper end of each shaft 2 is rotatably mounted in a substantially vertical bearing received in a housing 6 that forms part of a cover plate 7 which closes off the top of the hollow beam 1. It is preferred that the cover plate 7 should have a thickness of between 3 and 4 millimeters. The edges of the plate 7 are fastened to substantially horizontal rims of a lower portion 9 of the beam 1 that is of shallow U-shaped or channel shaped cross-section by bolts 8, a gasket being interposed between the cover plate and the rims. Each shaft 2 carries, internally of the main frame beam 1, a corresponding spur-toothed pinion 10, the pinions 10 being of such a size that the teeth of each one are in mesh with those of its neighbour or both of its neighbours.

The lowermost end of each shaft 2 projects downwardly from the bottom of the beam 1 beneath the corresponding bearing 4 and is secured to the center of a tine support 11 of the corresponding soil working member 3. The opposite ends of each tine support 11 are provided with substantially vertical sleeve-like tine holders. Each tine holder receives an upper fastening portion of a corresponding tine 12, at least the lower soil-working portion of which is of square or other angular cross-section. The upper fastening portion of each tine 12 terminates in a screw-threaded section which is entered upwardly through the tine holder concerned to receive a correspondingly screw-threaded conical nut. The perpendicular distance between the axes of rotation of neighbouring shafts 2 is preferably substantially 25 centimeters but the perpendicular distance between the lower-most ends or tips of the two tines 12 of each soil-working member 3 is a little greater than this so that, during the use of the cultivator, the twelve individual strips of ground worked by the soil working members 3 overlap one another to produce a single strip of worked soil.

The opposite ends of the hollow main frame beam 1 have arms 13 connected to them so as to be turnable upwardly and downwardly about a substantially horizontal axis afforded by pivots located close to the front of the beam 1 with respect to the direction A. A soil compressing member in the form of a roller 14 is rotatably mounted between the rearwardly projecting ends of the two arms 13, said roller 14 comprising a plurality of relatively spaced circumferential elongated elements 15 which are supported by a plurality of plates of the roller 14 in such a way as to be movable turnably relative to those plates and so as to be capable of disconnection therefrom, and reconnection thereto, without difficulty. If desired, the elongated elements 15 may extend helically around the longitudinal axis of the roller 14 but this is not illustrated in the drawings. The arms 13 are provided with means by which the angular settings thereof about their pivotal connections with the main frame beam 1 can be changed, said means being such as to enable any chosen settings to be maintained. This arrangement governs the horizontal level of the axis of rotation of the roller 14 relative to that of the remainder of the cultivator and this is the principal factor in determining the depth of penetration of the tines 12 into the soil during any particular soil working operation. Two shield plates 18 are located just beyond the opposite ends of the row of soil working members 3 and are connected by arms 16 to substantialy horizontal pivots 17 that define axes extending substantially parallel to the direction A. The shield plates 18 extend substantially parallel to the direction A and their general planes are normally substantially vertically disposed during operation of the cultivator. The lowermost edges of the shield plates 18 are arranged to slide over the ground surface during the use of the cultivator and the shield plates can move upwardly and downwardly about the axes defined by the pivots 17 to match undulations in the surface of the soil over which the cultivator is travelling. When the cultivator is to be transported from one place to another without performing any working operation, the shield plates 18 can be tilted upwardly about the axes defined by the pivots 17 through approximately 180° to bring them to inverted in operative positions in which they bear downwardly upon the top of the main frame beam 1.

The soil working members are arranged to be driven from a transmission mechanism 19 which includes a cast iron gear box 48 arranged on top of the main frame beam 1 by some of the same bolts 8 as are used to secure the cover plate 7 of said beam to the lower portion 9 thereof. The sixth shaft 2 from the left when the cultivator is viewed in the direction A has an upward extension 51 which is entered through a tubular sleeve 52 that extends between an oil-sealed aperture in the cover plate 7 and the lower surface of an upper horizontal portion of the profiled plate 50. The extension 51 projects upwardly through an aperture in the plate 50 and on through the overlying gear box 48 to terminate inside a cover 62 releasably mounted on top of the gear box 48. The portion of the shaft extension 51 which is located inside the cover 62 is splined and a spur-toothed pinion 53 is slidably mounted thereon in a readily releasable manner. A further spur-toothed pinion 54 is in driving mesh with the pinion 53 and is also located inside the cover 62 at the upper splined end of a shaft 55 that extends parallel to the shaft extension 51. The shaft 55 is rotatably mounted in the upper wall of the gear box 48 with the aid of two ball bearings 56 and its lowermost end, located inside the gear box 48, carries, or is integral with, a bevel pinion or crown wheel 57. The teeth of said bevel pinion or crown wheel 57 are in driven mesh with those of a smaller bevel pinion 58 located inside the gear box 48 by ball and roller bearings 60 and its leading splined end is arranged to be driven from the output of a slip clutch or like slip coupling 37 which forms a connection between the shaft 59 and a transmission shaft 38 which can be coupled to the power take-off shaft of a tractor or like vehicle.

The driving shaft 59 includes a splined rearward extension 61 of the shaft 59, the two readily removable spur-toothed pinions 53 and 54 are interchangeable and are also exchangeable for other pairs of co-operating pinions having different numbers of teeth to produce different speeds of rotation of the soil working members 3 in response to a single speed of rotation of the power take-off shaft which drives them. The cover 62 is maintained in its appointed position in a quickly releasable manner by two wing nuts 63, an oil-sealing gasket 64 being interposed between a lip of the cover 62 and the underlying gear box 48 to which said cover is secured by the wing nuts 63. It will be seen from FIG. 1 of the drawings that, in plan view, the shaft 55 is located obliquely behind the extension 51 of one of the shafts 2 with respect to the direction A. The fact that the interchangeable and exchangeable pinions are located beneath the cover 62 at the top of the cultivator makes access thereto particularly quick and simple.

The front of the main frame beam 1 with respect to the direction A carries a trestle-shaped coupling member 44 arranged for connection to the three-point lifting device or hitch of the same agricultural tractor or other vehicle whose power take-off shaft drives the transmission shaft 38 (see FIG. 1). The coupling member 44 is rigidly connected by rearwardly and downwardly divergent supports 45 to rear upper regions of the main frame beam 1.

In the use of the cultivator, the coupling member 44 is connected to the three-point lifting device or hitch of the operating agricultural tractor or other vehicle and the power take-off shaft by way of the transmission shaft 38 and slip clutch or like slip coupling 37. The speed of rotation of the soil working members 3 can be changed, without altering the speed of rotation of the power take-off shaft which operates said members 3, merely be releasing the two wing nuts 63, lifting off the quickly releasable cover 62, and either interchanging the two pinions 53 and 54 to the shafts 51 and 55 or exchanging those pinions for an alternative co-operating pair having different numbers of teeth to those of the pinions 53 and 54. It will be realised that four different speeds of rotation of the soil working members 3 can be attained by the provision of only two different co-operating pairs of toothed pinions and that the number of different speeds that are possible an be increased by the provision of further alternative co-operating pairs of toothed pinions. The shaft extension 61 can be used to supply rotary power for the operation of some other implement that is connected to the rear of the cultivator to perform a further operation upon the soil immediately following the action of the tines 12. Such implements can be seed drills, planting machines or implements for introducing fertilizer or liquid manure into the soil. With known machines, moving parts of the additional implements are frequently driven by means of a ground wheel so that, in operation, irregularities in driving often cannot be avoided. The soil that is worked by the tines 12 is gently compressed by the roller 14 that is located immediately behind said tines, the construction of the roller 14 being such that it tends to crumble any unbroken lumps of soil that are left behind by the tines 12. The particular form of mounting of the rotary shafts 2 between the lower bearings 4 and the upper housings 6, said housings 6 being integral with the cover plate 7 which is formed from metal of only 3 to 4 millimeters in thickness, provides an inexpensive construction which is quickly and readily assembled, the weight of the whole cultivator being maintained as low as possible.

What I claim is:

1. A cultivator comprising a row of soil working members that are rotatable about upwardly extending axes defined by corresponding shafts, said shafts each having a pinion, the teeth of which are in mesh with neighboring pinions, at least one shaft of a soil working member being drivenly connected to an input shaft that is connectable to the p.t.o. of a prime mover and said one shaft being connected to said input shaft through a transmission mechanism, said mechanism comprising an upwardly extending transmission shaft and an extension of said one upwardly extending shaft, and transmission shaft and extension extending substantially parallel to one another and having respective pinion gears at their upper ends, said gears being in engagement with one another and having different numbers of teeth whereby the gears are exchangeable with one another to vary the speed of rotation of said soil working members, pinion gears being located at the top of said mechanism and being rotated about upwardly extending axes during operation, said upwardly extending shaft extension being positioned in front of said transmission shaft with respect to the direction of cultivator travel.

2. A cultivator as claimed in claim 1, wherein said upwardly extending shaft extension is located obliquely in front of said transmission shaft.

3. A cultivator as claimed in claim 1, wherein said exchangeable pinion gears are housed within a cover of said mechanism, said cover being secured to the remainder of said mechanism with quick release means.

4. A cultivator as claimed in claim 1, wherein said mechanism comprises a gear-box which is a deformed flat metallic sheet.

* * * * *